US010957341B2

(12) United States Patent
Trella et al.

(10) Patent No.: US 10,957,341 B2
(45) Date of Patent: Mar. 23, 2021

(54) ULTRASONIC ATTACK DETECTION EMPLOYING DEEP LEARNING

(71) Applicant: Intel Corporation, Santa Clara, CA (US)

(72) Inventors: Pawel Trella, Gdansk (PL); Kuba Lopatka, Gdansk (PL); Jan Banas, Gdansk (PL); Piotr Klinke, Szczecin (PL)

(73) Assignee: Intel Corporation, Santa Clara, CA (US)

( * ) Notice: Subject to any disclaimer, the term of this patent is extended or adjusted under 35 U.S.C. 154(b) by 82 days.

(21) Appl. No.: 16/235,903

(22) Filed: Dec. 28, 2018

(65) Prior Publication Data

US 2019/0237096 A1 Aug. 1, 2019

(51) Int. Cl.

| | |
|---|---|
| ***G10L 25/84*** | (2013.01) |
| ***G10L 15/16*** | (2006.01) |
| ***G10L 15/22*** | (2006.01) |
| ***G06F 21/55*** | (2013.01) |
| ***G06N 20/00*** | (2019.01) |
| ***G10L 25/51*** | (2013.01) |
| *G10L 15/08* | (2006.01) |
| *G10L 25/30* | (2013.01) |

(52) U.S. Cl.

CPC ............ *G10L 25/84* (2013.01); *G06F 21/552* (2013.01); *G06F 21/554* (2013.01); *G06N 20/00* (2019.01); *G10L 15/16* (2013.01); *G10L 15/22* (2013.01); *G10L 25/51* (2013.01); *G06F 2221/032* (2013.01); *G10L 25/30* (2013.01); *G10L 2015/088* (2013.01)

(58) Field of Classification Search

USPC ................. 704/231–233, 246, 247, 251, 252

See application file for complete search history.

(56) References Cited

U.S. PATENT DOCUMENTS

2018/0068647 A1* 3/2018 Kim ........................ G10K 15/02
2018/0336332 A1* 11/2018 Singh ...................... G06F 21/32
2019/0043471 A1* 2/2019 Maziewski ......... G10L 21/0208

(Continued)

OTHER PUBLICATIONS

K. Johnson, “Google Assistant now supports August Smart Lock, Wink, and 11 other smart home device makers,” <venturebeat.com/2017/03/28/google-assistant-now-supports-august-smart-lock-wink-and-11-other-smart-home-device-makers>, Mar. 28, 2017, 3 pages.

(Continued)

*Primary Examiner* — Leonard Saint Cyr
(74) *Attorney, Agent, or Firm* — Jordan IP Law, LLC

(57) ABSTRACT

A mechanism, method, and computer readable medium to enhance speech enabled devices. The method comprising receiving, by an ultrasonic attack detector of a speech enabled device, an audio stream from one or more microphones and a segmentation signal from a keyword detector indicating a location of a detected keyword within the audio stream, preprocessing, by the ultrasonic attack detector, a segmented portion of the audio stream including the detected keyword to obtain a spectrogram, and executing, by the ultrasonic attack detector, a neural network classifier using the spectrogram as input, the neural network classifier to discern real human speech from intermodulation distortion products resulting from ultrasonic attacks on the speech enabled device.

25 Claims, 10 Drawing Sheets

600
602 Start
604 Receive audio input signal and segmentation
606 Preprocess segmented audio input signal
608 Determine features of input spectrogram using neural network
610 Score neural network output
612 Compute attack score
614 Compare results with pre-determined threshold
Keyword detection trigger

(56) References Cited

U.S. PATENT DOCUMENTS

| | | | | |
|---|---|---|---|---|
| 2019/0114497 | A1 * | 4/2019 | Lesso | G10L 17/00 |
| 2019/0122691 | A1 * | 4/2019 | Roy | H04R 1/40 |
| 2020/0082816 | A1 * | 3/2020 | Mahajan | G10L 15/30 |
| 2020/0113545 | A1 * | 4/2020 | Wang | G06N 20/20 |

OTHER PUBLICATIONS

Knowles.com, "Digital Zero-Height SiSonic Microphone With Multiple Performance Modes," <datasheetspdf.com/pdf-file/1402015/Knowles/SPH1668LM4H-1/1>, May 22, 2014, 14 pages.

N. Roy et al., "Inaudible Voice Commands: The Long-Range Attack and Defense," 15th USENIX Symposium on Networked Systems Design and Implementation <synrg.csl.illinois.edu/papers/lipread_nsdi18.pdf>, Aug. 2018, 14 pages.

L. Song et al., "Inaudible Voice Commands," <arxiv.org/pdf/1708.07238.pdf>, Aug. 24, 2017, 3 pages.

C. Smith, "Alexa and Sid Can Hear This Hidden Command. You Can't," <nytimes.com/2018/05/10/technology/alexa-siri-hidden-command-audio-attacks.html>, May 10, 2018.

L. Tung, "Alexa, Cortana, Google, Siri user? Watch out for these inaudible command attacks," <zdnet.com/article/alexa-cortana-google-siri-user-watch-out-for-these-inaudible-command-attacks/>, Sep. 7, 2017, 6 pages.

A. Villas-Boas, "14 ways you can control your home with your voice using Amazon's Echo and Alexa," <businessinsider.com/amazon-echo-alexa-control-smart-home-with-voice-2017-1?r=UK>, Jan. 10, 2017, 17 pages.

G. Zhang et al., "DolphinAttack: Inaudible Voice Commands," <arxiv.org/pdf/1708.09537.pdf>, Aug. 31, 2017, 15 pages.

* cited by examiner

1000
Processing Element 1070
1896a
Proc. Core
1074b
1074a
MC
1072
1076
1078
P-P
P-P
1050
Processing Element 1080
1896b
Proc. Core
1084b
1084a
1088
1086
MC
1082
P-P
P-P
Memory 1032
Memory 1034
Battery 1010
High-Perf. Graphics 1038
1049
IO Subsystem 1090
P-P
1092
1094
I/F
I/F
1096
P-P
1098
1016
Bus Bridge 1018
IO Devices 1014
Audio IO 1024
Keyboard/ Mouse 1012
Comm. Devices 1026
1020
1030
Data Storage 1019
Code

ULTRASONIC ATTACK DETECTION EMPLOYING DEEP LEARNING

TECHNICAL FIELD

Embodiments generally relate to speech-controlled devices. More particularly, embodiments relate to ultrasonic attack detection employing deep learning for speech-controlled devices.

BACKGROUND

Ultrasonic attacks, also known as dolphin attacks, may pose a serious security issue for speech-controlled devices. Such attacks may exploit the nonlinear characteristics of microphones within the speech-controlled devices at ultrasonic frequencies. It is possible to produce an inaudible ultrasonic attack signal which, after being captured by a microphone onboard the speech-controlled device, may result in inter-modulation distortion. Such distortion leaves a speech-like artifact signal in the baseband of human speech. The artifact signal is then processed by the speech-controlled device as if it were normal human speech even though it is inaudible over the air. A key phrase detection engine within the speech-controlled device may yield a false trigger, thereby causing automatic speech recognition to begin to process inaudible commands that may potentially be malicious. Thus, an attacker may take control over the speech-controlled device without the user's awareness.

Commercially available speech-controlled devices, such as, for example, Amazon® Echo, Google® Home, and Apple® HomePod, may be vulnerable to such attacks. This vulnerability constitutes a serious threat to users when maliciously exploited. Today smart speakers and other speech enabled devices have access to users' online shopping, Internet browsing, home lighting, home thermostat, and in some instances, access to security lock features. Potential dangers of dolphin attacks include, but may not be limited to, interaction jamming, identity theft, unauthorized purchases and interference with smart home systems. Therefore, an ultrasonic attack is an issue to be dealt with if one wishes to secure and consequently further popularize speech-based human computer interactions.

BRIEF DESCRIPTION OF THE DRAWINGS

The various advantages of the embodiments will become apparent to one skilled in the art by reading the following specification and appended claims, and by referencing the following drawings, in which:

Figure 1:
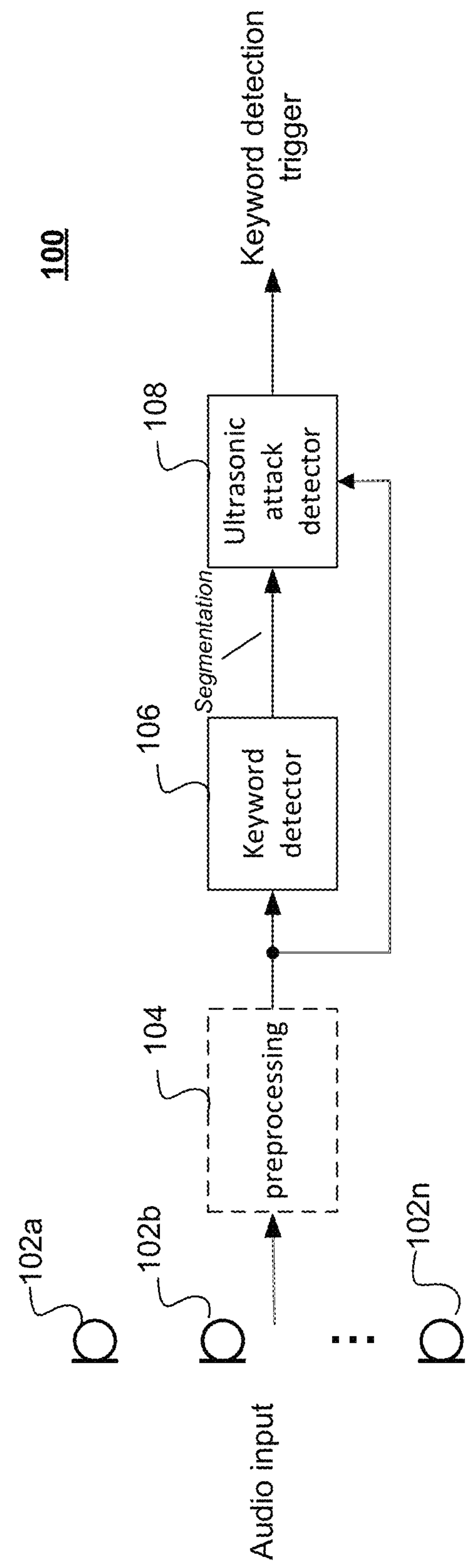
FIG. 1 is a block diagram illustrating an example of an enhancement mechanism for a speech enabled device capable of discerning real human speech from intermodulation distortion products resulting from ultrasonic attacks according to an embodiment.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

DESCRIPTION OF EMBODIMENTS

Technology to enhance speech enabled device capabilities by allowing the device to discern real human speech from intermodulation distortion products resulting from ultrasonic attacks. The enhanced speech enabled device includes, inter alia, a machine learning, data driven signal classifier trained to distinguish between normal speech and speech resulting from an ultrasonic attack (also known as a dolphin attack). The classifier includes two output classes: a dolphin attack class and a normal speech class or non-dolphin attack class. If the classifier output indicates that a dolphin attack has occurred, the corresponding keyword detection will be cancelled to prevent an attacker from executing commands on the enhanced speech enabled device. If the classifier output indicates normal speech has occurred, the corresponding keyword detection will be triggered to enable normal operations for the enhanced speech enabled device.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device). As used herein, the term "logic" and "module" may refer to, be part of, or include an application specific integrated circuit (ASIC), an electronic circuit, a processor (shared, dedicated, or group), and/or memory (shared, dedicated, or group) that execute one or more software or firmware programs having machine instructions (generated from an assembler and/or a compiler), a combinational logic circuit, and/or other suitable components that provide the described functionality.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

FIG. 1 is a block diagram illustrating an example of an enhancement mechanism 100 for a speech enabled device to discern real human speech from intermodulation distortion products resulting from ultrasonic attacks according to an embodiment. The enhancement mechanism 100 includes, inter alia, one or more microphones 102*a-n*, a keyword detector 106 and an ultrasonic attack detector 108. In one embodiment, the one or more microphones 102*a-n* may be coupled to an optional pre-processor 104 to pre-process an audio input stream received via the one or more microphones 102*a-n*. Pre-processing may include eliminating a non-zero DC (Direct Current) bias level from the audio signal received from the one or more microphones 102*a-n* that may degrade system performance and/or increase bit error rates. The pre-processing may also include boosting the level of the signal after the non-zero DC bias level is removed. The pre-processor is not limited to only removing the non-zero DC bias level and boosting the level of the audio signal. Other enhancements to the input audio signals may also be performed by the pre-processor 104, such as, for example, beamforming and acoustic echo cancellation, both of which are well-known to one skilled in the relevant art(s). In another embodiment, the optional pre-processor 104 may not be used. In this instance, the audio input stream bypasses the pre-processor 104 and is received directly by the keyword detector 106 and the ultrasonic attack detector 108.

The keyword detector 106 may be used to identify keywords that will activate or trigger the speech enabled device 100 to respond using machine learning and automatic speech recognition (ASR) techniques. For example, if the speech enabled device is an Echo device by Amazon, the keyword used to activate the Echo device may be "Alexa" or "Echo". Other speech enabled devices may use other keywords to activate the speech enabled devices.

The ultrasonic attack detector 108 may be used to enhance the speech enabled device 100 by discerning real human speech from intermodulation distortion products resulting from ultrasonic attacks. The ultrasonic attack detector 108 uses a machine learning, data-driven signal classifier with two output classes. The first output class represents a dolphin attack. The second output class represents real human speech. If the output of the ultrasonic attack detector 108 represents a dolphin attack, the corresponding keyword detector 106 is cancelled to prevent an attacker from executing any malicious commands on the speech enabled device 100. If the output of the ultrasonic attack detector 108 represents real human speech, the speech enabled device 100 will continue normal operations.

The classifier must be trained to distinguish between real human speech and speech that includes a dolphin attack. Dolphin attacks exploit a nonlinear behavior of microphones at high frequencies. An attack may occur when a cautiously prepared ultrasonic attack signal is transmitted in the proximity of the speech enabled device 100. The dolphin attack signal is a mixture of baseband speech signal modulated into an ultrasonic band and corresponding carrier frequency. Due to high intermodulation distortion of the microphones at high frequencies for the speech enabled device 100, the above mentioned ultrasonic signals are subject to intermodulation and the intermodulation distortion products may appear in the speech baseband. The resulting baseband speech signal with the intermodulation distortion products is hardly distinguishable from the real baseband speech signal for state of the art speech recognition engines.

In an embodiment, the machine learning, data-driven signal classifier may be implemented as an artificial neural network trained to distinguish between real speech and speech from an ultrasonic attack. Training of the artificial neural network may occur at the factory prior to purchase of the device. Dolphin attack simulations are used to generate data for artificial neural network training. Knowledge of how a dolphin attack works is required to simulate an attack signal $x'(t)$ based on a baseband speech signal $x(t)$.

Figure 2A:
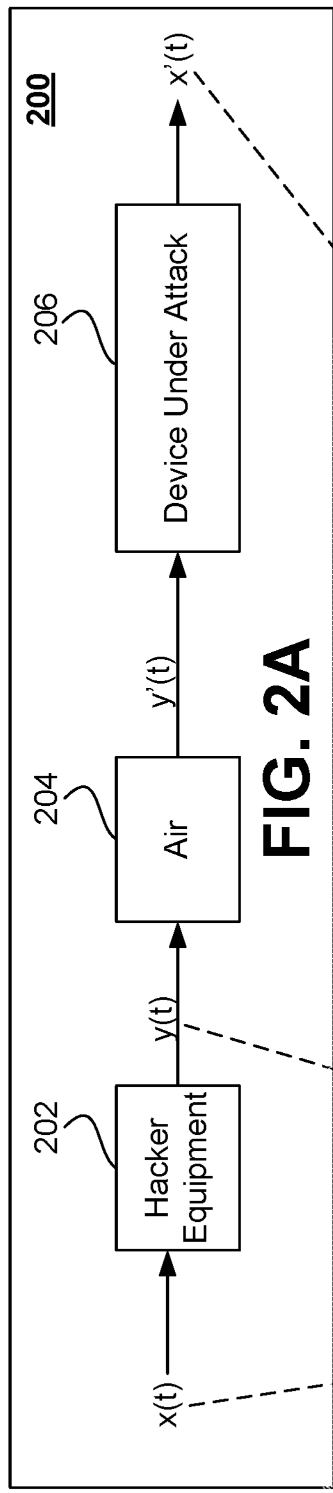
FIG. 2A is a diagram illustrating three building blocks required to simulate an attack signal x'(t) based on a baseband speech signal x(t) according to an embodiment.

FIG. 2A illustrates three building blocks required to simulate the attack signal $x'(t)$ based on the baseband speech signal $x(t)$ according to an embodiment. As shown in FIG. 2A, the first building block is represented as hacker equipment 202. The hacker equipment 202 may be implemented as a DSP (Digital Signal Processing) algorithm having a high sampling (i.e., 96 kHz or above). The hacker equipment 202 receives a baseband speech signal $x(t)$ and outputs an ultrasonic signal $y(t)$ that is rendered via a loudspeaker (not explicitly shown). The ultrasonic signal $y(t)$ is transmitted through the second building block, which is represented as Air 204. Air 204 may be represented as a linear time invariant system with a known impulse response. This system may be implemented as a discrete FIR filter using the same high sampling as indicated above. The ultrasonic signal captured by a microphone within the speech enabled device, y'(t), is shown as input to the third building block 206. y'(t) is the signal resulting from transmission through the second building block, Air 204. The ultrasonic attack signal is relatively narrowband in relation to its center frequency. Also transfer functions at such high frequencies would be hard to determine or predict since acoustic properties of a channel remain unknown. Taking into account both of these factors allows one to simplify the simulation and assume that y'(t)=y(t). The third building block is represented as Device under Attack 206. The Device under Attack 206 may be implemented as non-linear digital filters with high intermodulation distortions. Various combinations of filters may be implemented to achieve the desired result of a baseband speech signal with high intermodulation distortions, represented as x'(t).

Figure 2B:
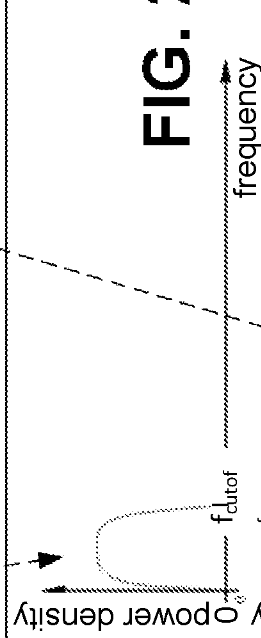
FIG. 2B is an illustration of an example signal spectrum representing an attacker input command x(t) according to an embodiment.

FIG. 2B is an illustration of an example signal spectrum representing an attacker input command x(t) according to an embodiment. The attacker input command x(t) is shown as a signal having a frequency from approximately 0 to a cutoff frequency.

Figure 2C:
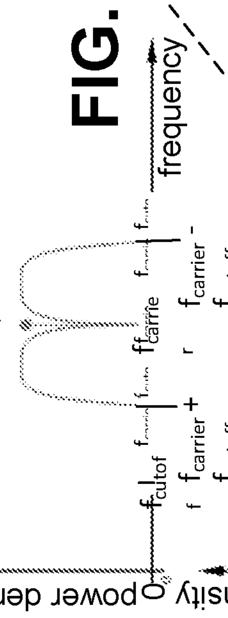
FIG. 2C is an illustration of an example signal spectrum representing an inaudible modulated ultrasonic attach signal y(t) according to an embodiment.

FIG. 2C is an illustration of an example signal spectrum representing an inaudible modulated ultrasonic attach signal y(t) according to an embodiment. As shown in FIG. 2C, the frequency range of the inaudible modulated ultrasonic attach signal y(t) is from the (ultrasonic carrier frequency−cutoff frequency) to the (ultrasonic carrier frequency+cutoff frequency).

Figure 2D:
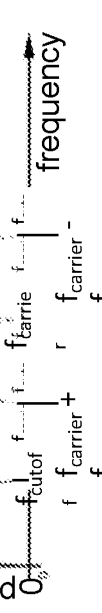
FIG. 2D is an illustration of an example signal spectrum representing a baseband attack signal with intermodulation distortion product x'(t) on the device under attack according to an embodiment.

FIG. 2D is an illustration of an example signal spectrum representing the baseband attack signal with intermodulation distortion product x'(t) on the device under attack 206. As shown, the ultrasonic components are not visible in the device under attack's spectrum because of anti-aliasing filters and low sampling frequencies, but the intermodulation products' energy at low frequencies may be high enough to mimic real speech.

Figure 3:
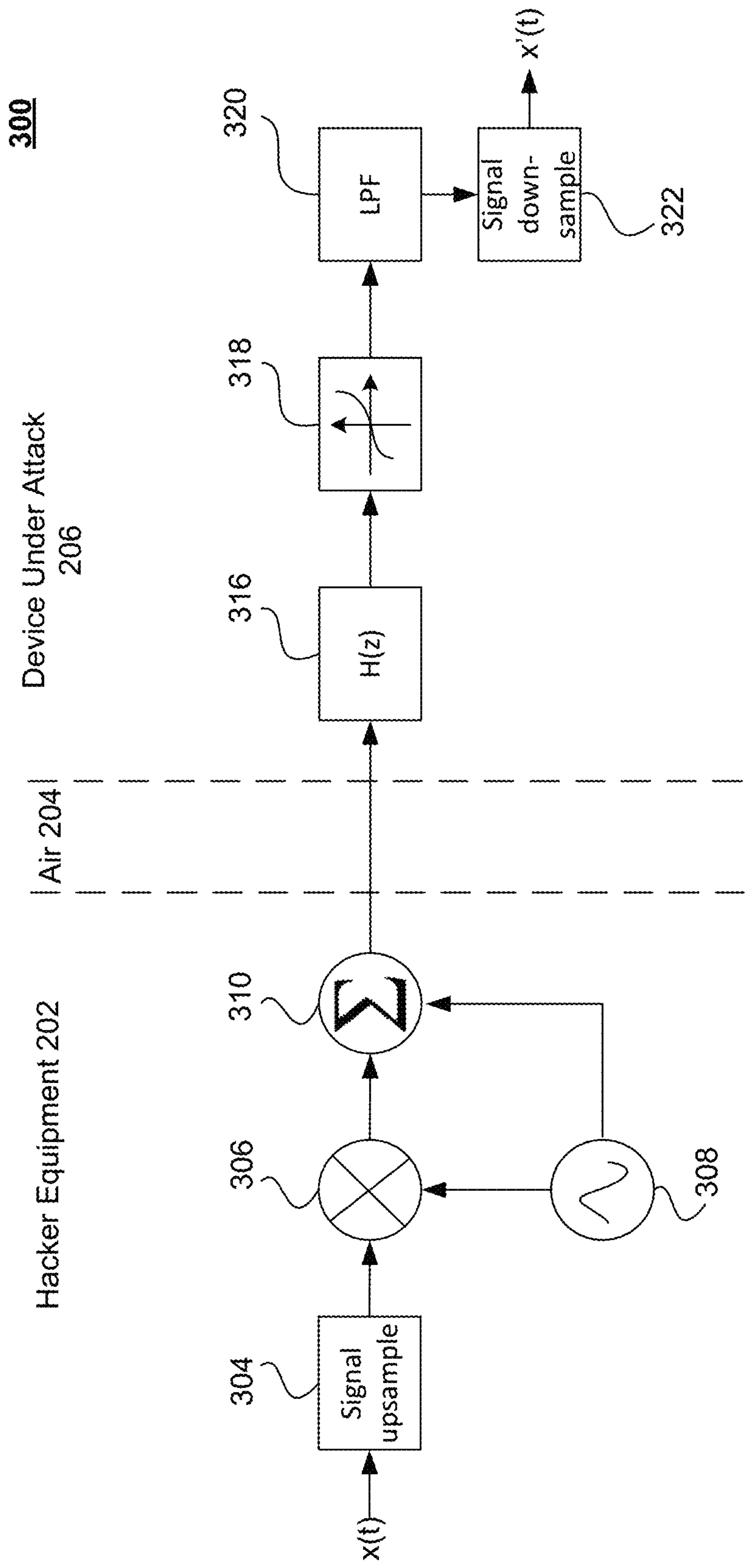
FIG. 3 is a detailed block diagram of an example attack simulation implementation according to an embodiment.

FIG. 3 is a detailed block diagram of an example attack simulation implementation 300 according to an embodiment. The basic building blocks, 202, 204, and 206, as shown in FIG. 2A are also shown in FIG. 3. The attack may be simulated in the digital processing domain. In order to train the machine learning classifier to distinguish between real human speech and intermodulation distortion products resulting from ultrasonic attacks, attack signals are simulated to provide the training data needed to train the machine learning classifier to recognize intermodulation distortion products of dolphin attacks.

The hacker equipment block 202 replicates how an attack will be produced by a hacker. The hacker equipment block 202 comprises an input baseband speech signal x(t) recorded at a sample frequency of 4-8 kHz or 16 kHz, which is normal sampling of a speech signal. In order to simulate how the baseband speech signal x(t) will look at ultrasonic sampling frequencies, x(t) is upsampled at 304 to an ultrasonic sampling frequency. In one embodiment, the ultrasonic sampling frequency may be 192 kHz. The upsampled signal is modulated at 306 and mixed at 310 using an ultrasonic carrier oscillator 308 to obtain the attack signal y(t) from the hacker equipment 202.

For reasons previously stated with reference to FIG. 2A, air propagation is not simulated. Thus, y(t) is shown as being transmitted through the air block 204 to the device under attack block 206. The device under attack block 206 simulates the intermodulation distortion on the device under attack in the digital domain. The intermodulation distortion is accomplished through filtering. At 316, a device transfer function is used to filter y(t). Next, the output signal from the device transfer function is filtered at 318 using a non-linear filter. The output of the non-linear filter is then filtered through an anti-aliasing filter at 320. In one embodiment, the anti-aliasing filter may be a low pass filter. The output signal from the anti-aliasing filter is then down sampled at 322 to obtain a baseband signal x'(t). The signal x'(t) is the signal after the attack has occurred. The signal x'(t) is similar to the input signal x(t), but it includes features of the ultrasonic attack. Thus, the ultrasonic attack with regards to the device under test's microphones is speech that is not audible in the air by humans. It also should not be audible through the microphones, but because it is a distortion point of ultrasonic frequencies, it is audible through the microphones.

Figure 4A:
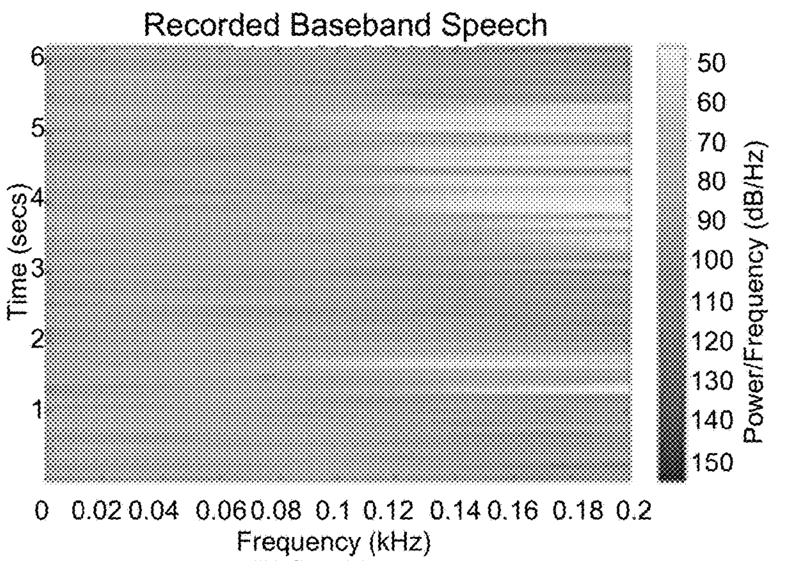
FIGS. 4A-4D illustrate a comparison of recorded speech vs. simulated speech over a frequency range of 0-200 Hz according to an embodiment.
Figure 4B:
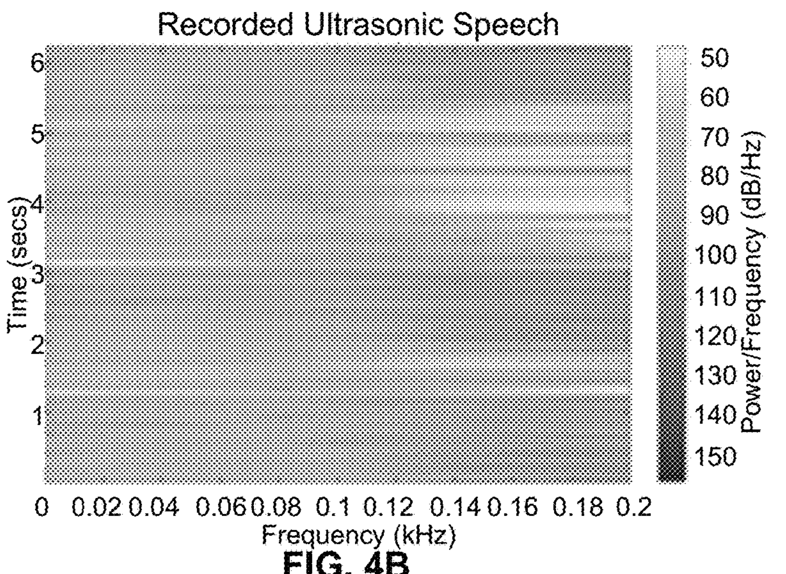
Figure 4C:
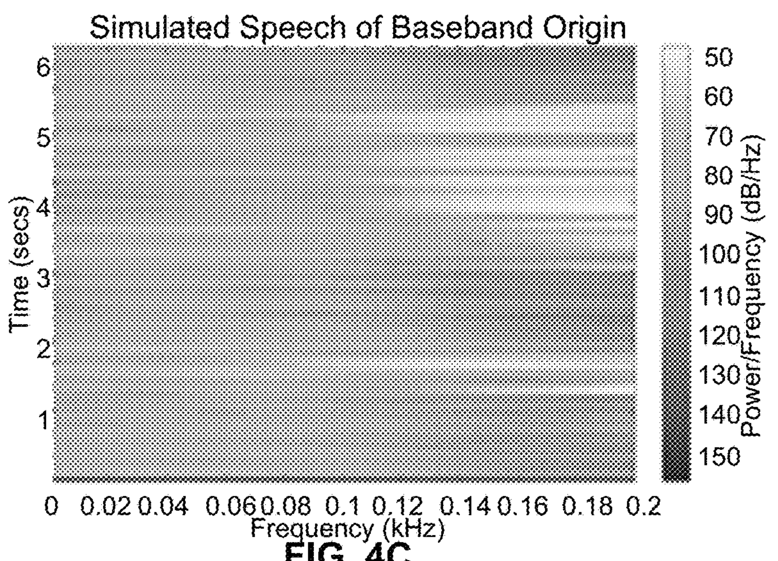
Figure 4D:
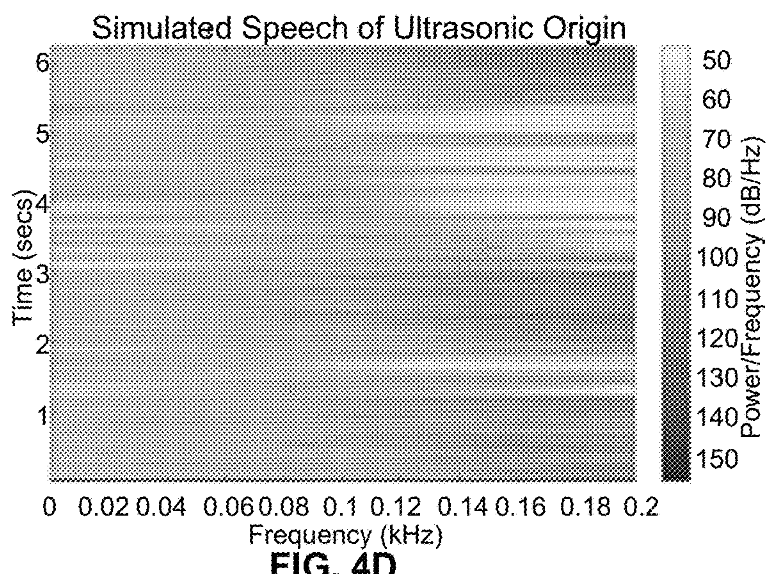

An example simulation implementation was evaluated for its accuracy against actual recordings of ultrasonic attack signals using vulnerable DMICs (Digital Microphones). The results of the simulation implementation are highlighted in FIGS. 4A-4H. An identical speech sample was examined in each case—utterance of a female voice, time-aligned and normalized to the same RMS (Root Mean Square) level. FIGS. 4A-4D illustrate a comparison of recorded speech vs. simulated speech over a frequency range of 0-200 Hz according to an embodiment. FIGS. 4A and 4B illustrate recorded baseband speech and recorded ultrasonic speech, respectively. FIGS. 4C and 4D illustrate simulated speech of baseband origin and simulated speech of ultrasonic origin, respectively. As shown in FIGS. 4A-4B, similar trends are present in both the recorded and simulated signal pairs. There is an increase in energy between baseband and ultrasonic signals below 50 Hz.

Figure 4E:
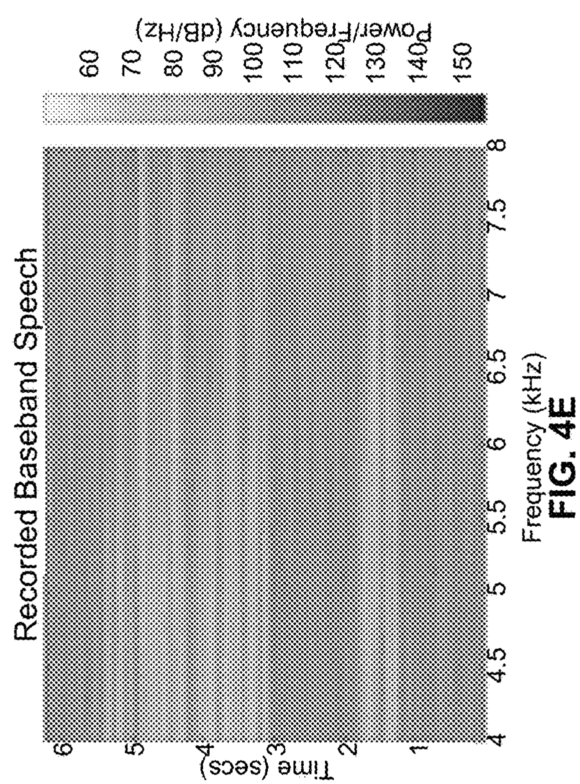
FIGS. 4E-4H illustrate a comparison of recorded speech vs. simulated speech over a frequency range of 4-8 kHz according to an embodiment.
Figure 4F:
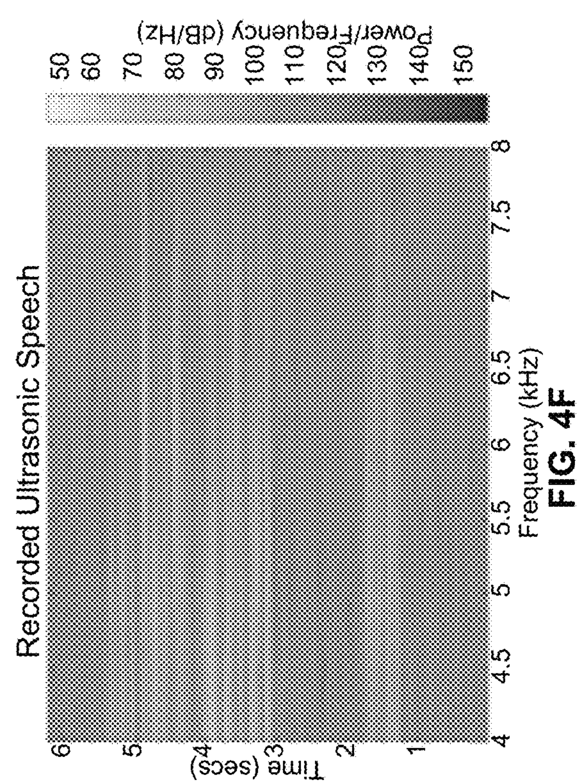
Figure 4G:
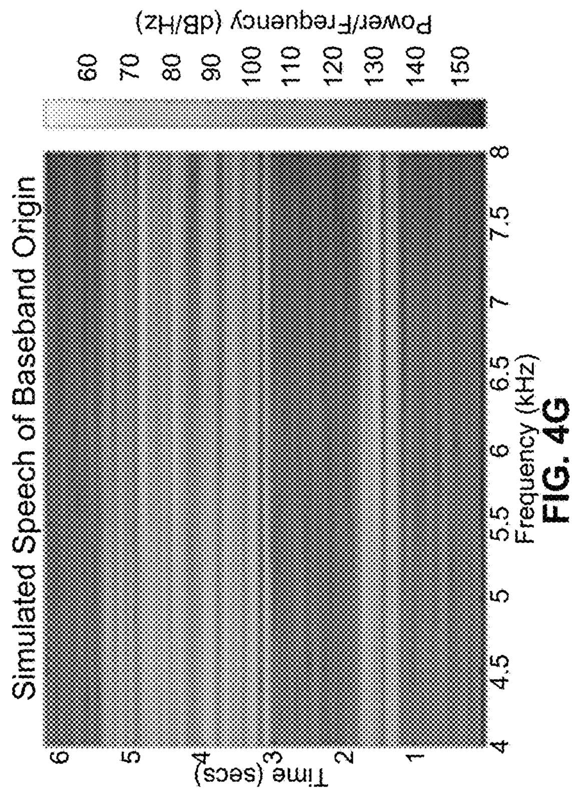
Figure 4H:
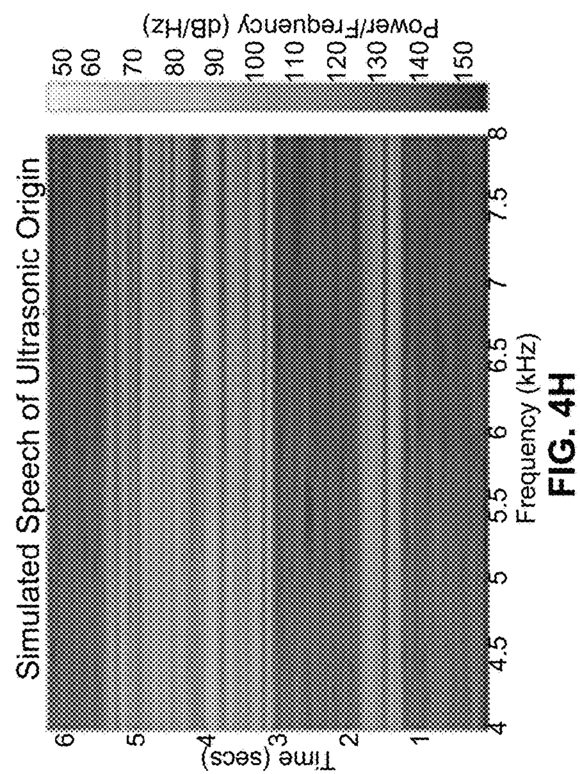

FIGS. 4E-4H illustrate a comparison of recorded speech vs. simulated speech over a frequency range of 4-8 kHz according to an embodiment. FIGS. 4E and 4F illustrate recorded baseband speech and recorded ultrasonic speech, respectively. FIGS. 4G and 4H illustrate simulated speech of baseband origin and simulated speech of ultrasonic origin, respectively. As shown in FIGS. 4E-4H, similar trends are again present in both the recorded and simulated signal pairs. Unlike the baseband and ultrasonic signals below 50 Hz, there is a decrease in energy between baseband and ultrasonic signals above 4 kHz.

Figure 5:
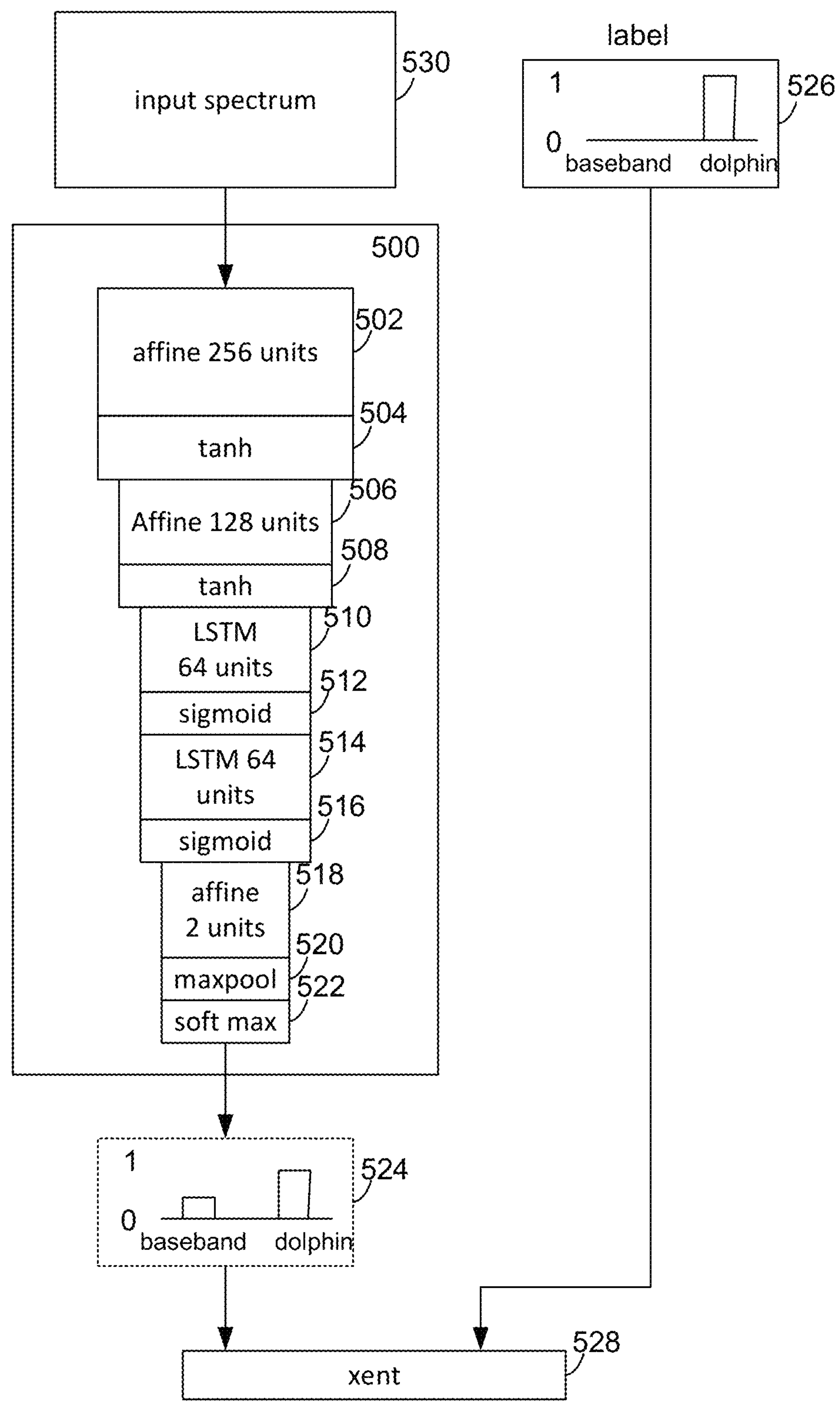
FIG. 5 is a diagram illustrating a neural network topology for a machine learning classifier according to an embodiment.

As previously indicated, a machine learning classifier is trained to distinguish between baseband (original) signals, x(t), and the signals resulting from ultrasonic attacks, x'(t). FIG. 5 is a diagram illustrating a neural network topology for a machine learning classifier 500 according to an embodiment. The network has a recurrent topology that comprises two (2) affine layers 502 and 506 and two (2) Long Short-Term Memory (LSTM) layers 510 and 514. The network output comprises an affine layer 518 followed by a global max pooling layer 520 and a softmax activation function 522.

Note that the size decreases with depth. The affine layer 502 includes 256 units (i.e, cells or multiply add nodes in the neural network) while affine layer 506 includes 128 units. The LSTM layers 510 and 514 each include 64 units. The last affine layer 518 includes 2 units.

The input to the network is a magnitude spectrogram of the utterance, segmented after keyword detection (as shown in FIG. 1). Employing the magnitude spectrum as input provides a rich generic representation of the signal, allowing the network to learn the important features on its own. The spectrogram enables the analysis of a full band.

The affine layers 502 and 506 are placed at the beginning of the topology to extract the higher level features and to reduce the dimensionality before being fed into the recurrent LSTM layer 510. The affine layers 502 and 506 are used to capture co-dependents on some of the spectral energy coefficients and they learn the patterns that appear in the spectrum. The affine layers 502, 506, and 518 do not possess memory.

The LSTM layers 510 and 514 have memory which allows them to learn temporal dependencies across frames. They not only learn the shape of the individual spectral frames, but also the temporal evolution. The LSTM layers can remember what they saw a few steps back and compare it with what they currently see, while learning the temporal qualities. Two LSTM layers 510 and 514 are used to enable capture of more complex, more high level dependencies and higher levels of abstractions.

Again, at the output of the network is another affine layer 518. Affine layer 518 has only two units. One of the units fires for the dolphin attack signal and the other unit fires for the baseband real speech signal.

The max pool layer 520 selects the maximum output value from the entire temporal sequence. The softmax layer 522 normalizes the network outputs so that they are all between the values of 0 and 1, wherein the output with the highest value gets the highest value after softmax and all outputs sum up to 1. An example visualization of the softmax outputs is shown as 524.

The desired neural network output, also known as the ground truth label, is shown as 526. The desired neural network output is compared with the softmax outputs using a cross entropy function (xent) 528, which is an error metric for classification. In embodiments, cross entropy function 528 may be used interchangeably with other metrics, such as, for example, mean squared error.

Note that non-linear functions, such as hyperbolic tangent 504 and 508 and sigmoid 512 and 516, are known as squashing functions or activation functions. They are strategically placed within the neural network to immediately follow the first two affirm layers 502 and 506 and the two LSTM layers 510 and 514, respectively. Inserting non-linear squashing functions enables the whole network to be highly non-linear and able to learn very complex dependencies. The hyperbolic tangent activation function matches real values to the interval −1 to 1, while the sigmoid activation function matches everything to values from 0 to 1.

Although affine and LSTM layers were chosen with non-linear hyperbolic tangent and sigmoid activation functions for the neural network, embodiments may use other layer types and activation functions. For example, alternatives for the LSTM layers may include, for example, recurrent neural networks (RNN), networks with Gated Recurrent Units (GRU), networks with Convolutional layers (CNNs) including gated convolutions and convolutions applied directly to the waveform input, and time-delay neural networks. Alternatives for the affine layers may include, but not be limited to, networks with Convolutional layers (CNNs) including gated convolutions and convolutions applied directly to the waveform input. Alternatives for the hyperbolic tangent and sigmoid functions may include, but are not limited to, rectified linear unit activation functions (ReLU) and maxout activation functions. Different topology networks may be used in embodiments, and recurrent layers, such as, for example, LSTM and GRU, are beneficial.

Figure 6:
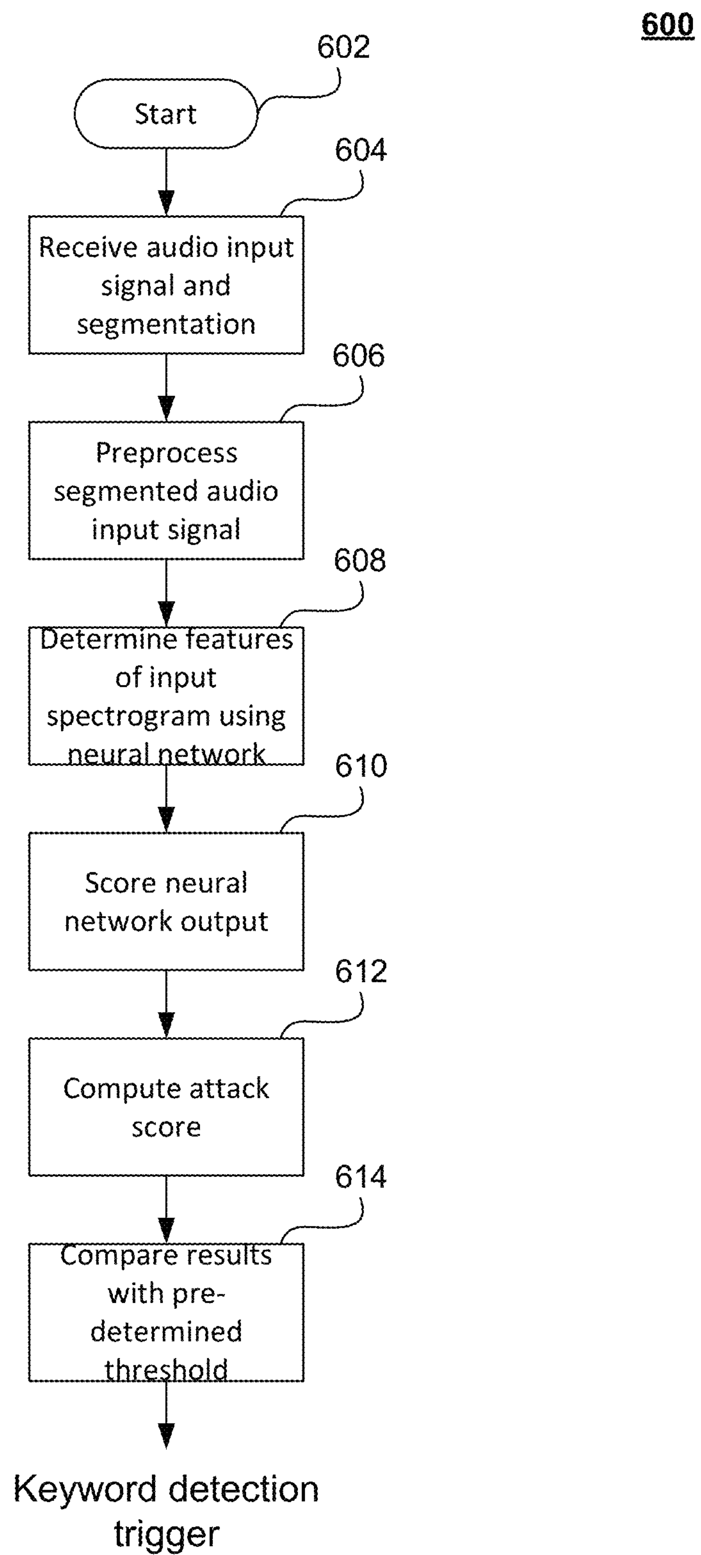
FIG. 6 is a flow diagram of an example method 600 of performing ultrasonic attack detection for a speech enabled device capable of discerning real human speech from intermodulation distortion products resulting from ultrasonic attacks according to an embodiment.

FIG. 6 is a flow diagram of an example method 600 of performing ultrasonic attack detection for a speech enabled device capable of discerning real human speech from intermodulation distortion products resulting from ultrasonic attacks according to an embodiment. The method 600 may generally be implemented in a mechanism such as, for example, the enhanced mechanism 100 of a speech enabled device as shown in FIG. 1. More particularly, the method 600 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), and fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 600 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instruction, instruction set architecture (ISA) instructions, machine instruction, machine depended instruction, microcode, state setting data, configuration data for integrated circuitry, state information that personalizes electronic circuitry and/or other structural components that are native to hardware (e.g., host processor, central processing unit (CPU), microcontroller, etc.).

The process begins in block 602, where the process immediately proceeds to block 604. In block 604, the audio input signal (also referred to as the audio input stream) from the microphone 102*a-n* of FIG. 1 are received by the ultrasonic attack detector 108. The ultrasonic attack detector 108 also receives the segmentation input from the keyword detector 106 of FIG. 1. As previously indicated, the segmentation input defines the location of the keyword in the audio input stream. The process then proceeds to block 606.

In block 606, preprocessing of the audio input data defined by the location of the keyword in the audio input stream (i.e., segmentation) is performed. Preprocessing may include one or more of eliminating a non-zero DC (Direct Current) bias level from the audio signal received from the one or more microphones 102*a-n* that may degrade system performance and/or increase bit error rates, boosting the level of the audio signal, beamforming to combine audio signals in a manner that increases the signal strength to/from a chosen direction while attenuating all other audio signals to/from undesired directions, and acoustic echo cancellation. Preprocessing of the audio input stream is well-known to one skilled in the relevant art(s). Preprocessing results in an audio spectrogram that is used as input into the machine learning classifier 500. The process proceeds to block 608.

In block 608, the machine learning classifier 500 (i.e., the neural network) is run to determine the features of the magnitude input spectrogram. Thus, the neural network is run on the features of the input spectrogram up through the activation of the last affine layer, after max pooling over the entire sequence, but before softmax. As previously indicated, the last affine layer has two units, one unit firing for the baseband real speech signal and one unit firing for the dolphin attack signal. The process then proceeds to block 610.

In block 610, the neural network 500 is scored. The neural network 500 is scored using a procedure called "forward propagation". Forward propagation is well known to one skilled in the relevant art(s). The process then proceeds to block 612.

In block 612, the attack score is computed. The attack score is determined as the difference between the outputs (output 1 for firing baseband real speech signal output and output 2 for firing dolphin attack signal output) of the last layer (i.e., affine layer 518 having two units) of the neural network 500 shown in FIG. 5. The process then proceeds to block 614.

In block 614, the attack score is compared with a pre-determined threshold. If the attack score is lower than the pre-determined threshold, the audio signal keyword is recognized as an ultrasonic attack and is rejected. If the attack score is equal to or higher than the pre-determined threshold, the audio signal keyword is recognized as human speech and is accepted. In this instance, the keyword is used to trigger the device.

Figure 7:
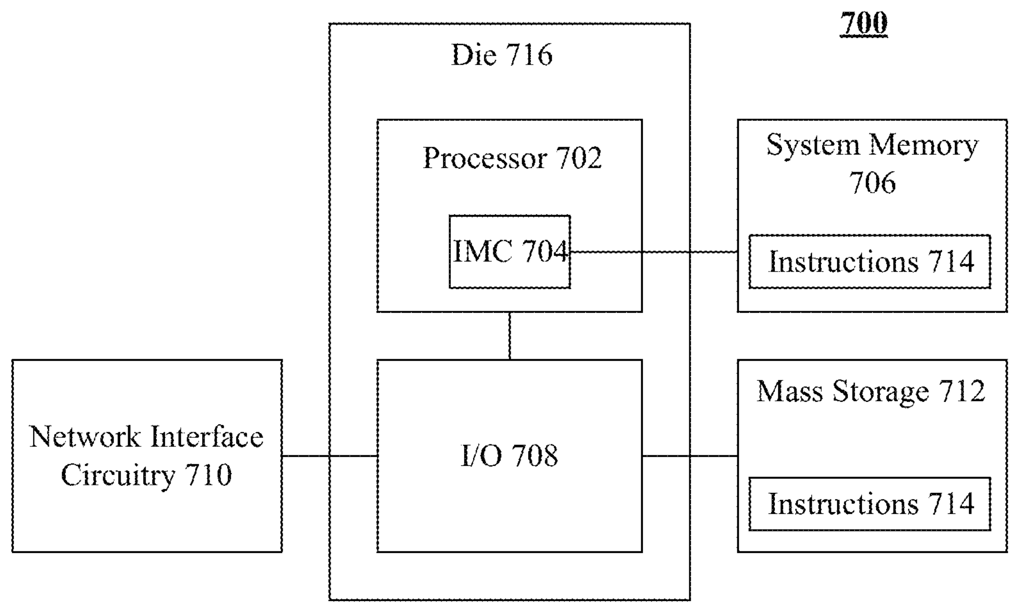
FIG. 7 is a block diagram of an example of a speech enabled device having an enhancement mechanism to discern real human speech from intermodulation distortion products resulting from ultrasonic attacks according to an embodiment.

FIG. 7 shows a system 700 that may be readily substituted for the speech enabled device, including the enhancement mechanism shown above with reference to FIG. 1. The illustrated system 700 includes a processor 702 (e.g., host processor, central processing unit/CPU) having an integrated memory controller (IMC) 704 coupled to a system memory 706 (e.g., volatile memory, dynamic random-access memory/DRAM). The processor 702 may include a core region with one or more processor cores (not shown). The processor 702 may also be coupled to an input/output (I/O) module 708 that communicates with network interface circuitry 710 (e.g., network controller, network interface card/NIC) and mass storage 712 (non-volatile memory/NVM, hard disk drive/HDD, optical disk, solid state disk/SSD, flash memory). The network interface circuitry 710 may receive data such as, for example, data to be provided to the user in response to an audio inquiry/request made by the user, wherein the system memory 706 and/or the mass storage 712 may be memory devices that store instructions 714, which when executed by the processor 702, cause the system 700 to perform one or more aspects of the method 600 (FIG. 6), already discussed. Thus, execution of the instructions 714 may cause the system 700 to receive, by an ultrasonic attack detector of a speech enabled device, an audio stream from one or more microphones and a segmentation signal from a keyword detector to indicate a location of a detected keyword within the audio stream, preprocess, by the ultrasonic attack detector, a segmented portion of the audio stream to obtain a magnitude spectrogram, wherein the segmented portion of the audio stream includes the keyword utterance, and run, by the ultrasonic attack detector, a neural network classifier using the magnitude spectrogram as input, the neural network classifier to discern real human speech from intermodulation distortion products resulting from ultrasonic attacks on the speech enabled device. The processor 702 and the IO module 708 may be incorporated into a shared die 716 as a system on chip (SoC).

Figure 8:
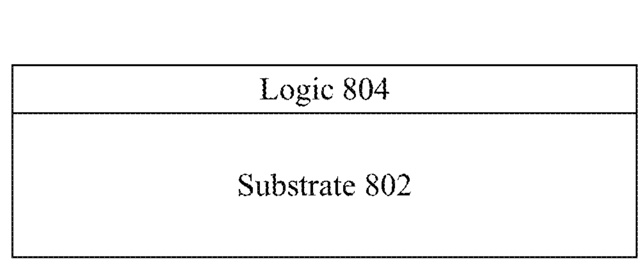
FIG. 8 is an illustration of an example of a semiconductor package apparatus according to an embodiment.

FIG. 8 shows a semiconductor package apparatus 800 (e.g., chip) that includes a substrate 802 (e.g., silicon, sapphire, gallium arsenide) and logic 804 (e.g., transistor array and other integrated circuit/IC components) coupled to the substrate 802. The logic 804, which may be implemented in configurable logic and/or fixed-functionality logic hardware, may generally implement one or more aspects of the method 600 (FIG. 6), already discussed.

Figure 9:
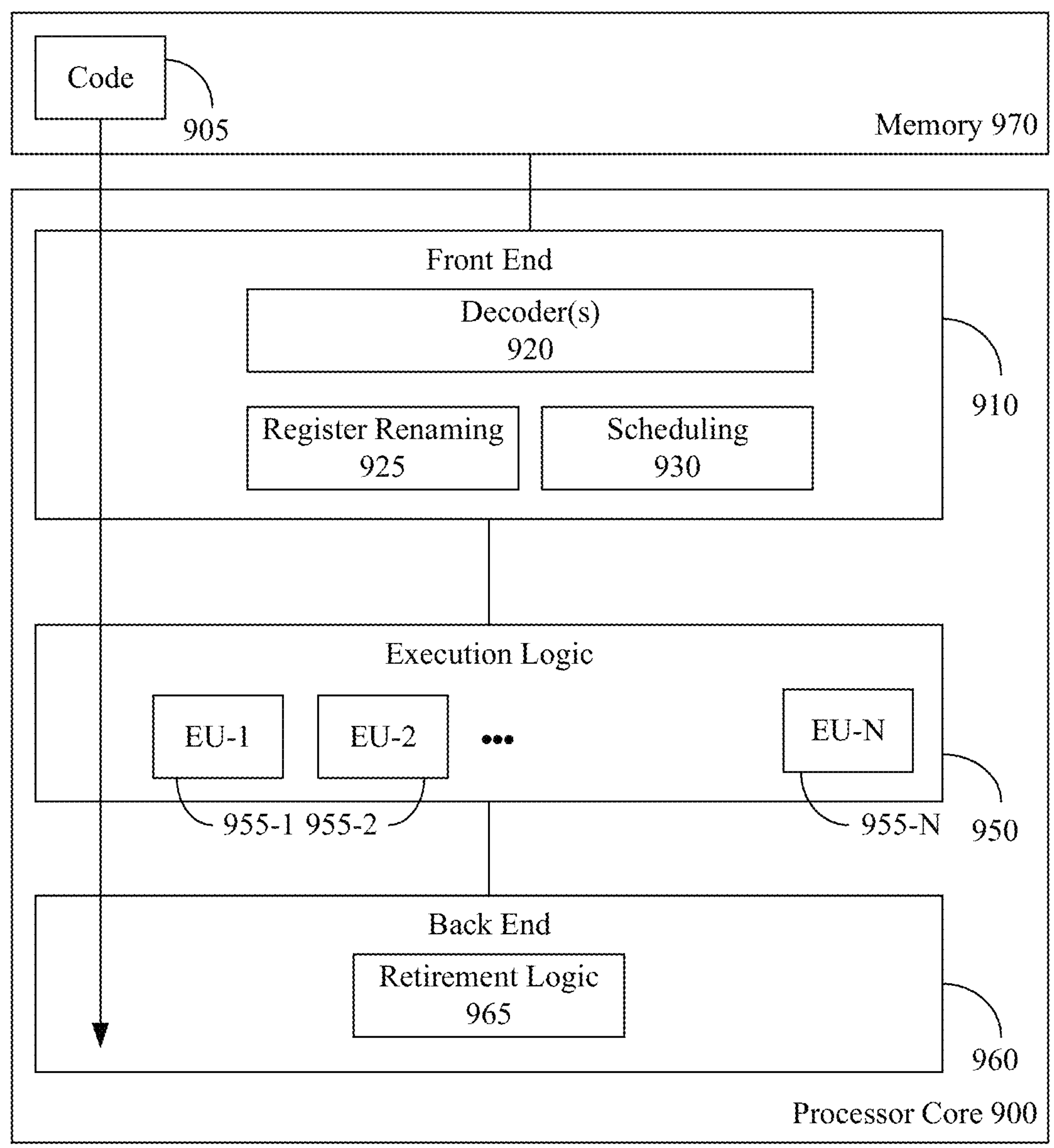
FIG. 9 is a block diagram of an exemplary processor according to an embodiment.

FIG. 9 illustrates a processor core 900 according to one embodiment. The processor core 900 may be the core for any type of processor, such as a micro-processor, an embedded processor, a digital signal processor (DSP), a network processor, or other device to execute code. Although only one processor core 900 is illustrated in FIG. 9, a processing element may alternatively include more than one of the processor core 900 illustrated in FIG. 9. The processor core 900 may be a single-threaded core or, for at least one embodiment, the processor core 900 may be multithreaded in that it may include more than one hardware thread context (or "logical processor") per core.

FIG. 9 also illustrates a memory 970 coupled to the processor core 900. The memory 970 may be any of a wide variety of memories (including various layers of memory hierarchy) as are known or otherwise available to those of skill in the art. The memory 970 may include one or more code 905 instruction(s) to be executed by the processor core 900, wherein the code 905 may implement the method 400 (FIG. 4), the method 400 (FIG. 4), the method 500 (FIG. 5), and the method 600 (FIG. 6), already discussed. The processor core 900 follows a program sequence of instructions indicated by the code 905. Each instruction may enter a front end portion 910 and be processed by one or more decoders 920. The decoder 920 may generate as its output a micro operation such as a fixed width micro operation in a predefined format, or may generate other instructions, microinstructions, or control signals which reflect the original code instruction. The illustrated front end portion 910 also includes register renaming logic 925 and scheduling logic 930, which generally allocate resources and queue the operation corresponding to the convert instruction for execution.

The processor core 900 is shown including execution logic 950 having a set of execution units 955-1 through 955-N. Some embodiments may include a number of execution units dedicated to specific functions or sets of functions. Other embodiments may include only one execution unit or one execution unit that can perform a particular function. The illustrated execution logic 950 performs the operations specified by code instructions.

After completion of execution of the operations specified by the code instructions, back end logic 960 retires the instructions of the code 905. In one embodiment, the processor core 900 allows out of order execution but requires in order retirement of instructions. Retirement logic 965 may take a variety of forms as known to those of skill in the art (e.g., re-order buffers or the like). In this manner, the processor core 900 is transformed during execution of the code 905, at least in terms of the output generated by the decoder, the hardware registers and tables utilized by the register renaming logic 925, and any registers (not shown) modified by the execution logic 950.

Although not illustrated in FIG. 9, a processing element may include other elements on chip with the processor core 900. For example, a processing element may include memory control logic along with the processor core 900. The processing element may include I/O control logic and/or may include I/O control logic integrated with memory control logic. The processing element may also include one or more caches.

Figure 10:
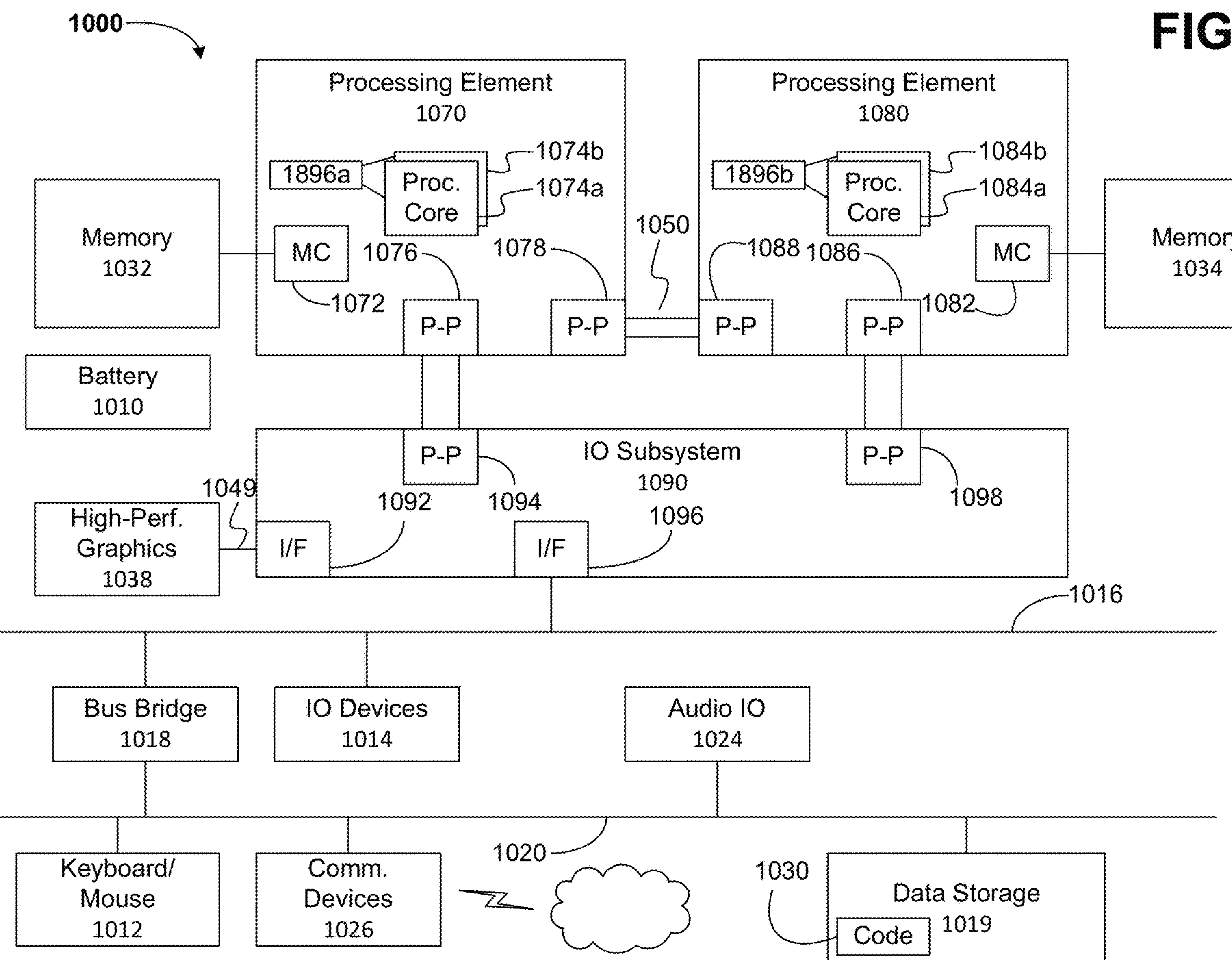
FIG. 10 is a block diagram of an exemplary computing system according to an embodiment.

Referring now to FIG. 10, shown is a block diagram of a computing system 1000 in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner similar to that discussed above in connection with FIG. 9.

Each processing element 1070, 1080 may include at least one shared cache 1096*a*, 1096*b*. The shared cache 1096*a*, 1096*b* may store data (e.g., instructions) that are utilized by one or more engines of the processor, such as the cores 1074*a*, 1074*b* and 1084*a*, 1084*b*, respectively. For example, the shared cache 1096*a*, 1096*b* may locally cache data stored in a memory 1032, 1034 for faster access by engines of the processor. In one or more embodiments, the shared cache 1096*a*, 1096*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these engines.

In turn, I/O subsystem 1090 may be coupled to a first bus 1016 via an interface 1096. In one embodiment, the first bus 1016 may be a Peripheral Engine Interconnect (PCI) bus, or a bus such as a PCI Express bus or another third generation I/O interconnect bus, although the scope of the embodiments are not so limited.

As shown in FIG. 10, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 300 (FIG. 3), the method 400 (FIG. 4), method 500 (FIG. 5), and the method 600 (FIG. 6), already discussed, and may be similar to the code 905 (FIG. 9), already discussed. Further, an audio I/O 1024 may be coupled to second bus 1020 and a battery 1010 may supply power to the computing system 1000.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

ADDITIONAL NOTES AND EXAMPLES

Example 1 may include Example 1 may include an enhancement mechanism for speech enabled devices comprising one or more microphones to receive an audio stream; a keyword detector coupled to the one or more microphones to detect utterances of keywords used to trigger a speech enabled device, wherein the keyword detector to provide a segmentation signal indicating the location of a detected keyword within the audio stream; and an ultrasonic attack detector coupled to the one or more microphones and the keyword detector to preprocess a segmented portion of the audio stream that includes the detected keyword to obtain a spectrogram and to run a neural network classifier using the spectrogram as input, the neural network classifier to discern real human speech from intermodulation distortion products resulting from ultrasonic attacks on the speech enabled device.

Example 2 may include the enhancement mechanism of example 1, wherein the neural network classifier comprises a recurrent topology having recurrent layers to extract features of the spectrogram, learn patterns and temporal dependencies across frames associated with the spectrogram, and capture high level dependencies and high levels of abstractions from the spectrogram.

Example 3 may include the enhancement mechanism of example 1, wherein a neural network classifier output layer comprises two units, a first unit to fire for a dolphin attack signal and a second unit to fire for a real human baseband signal.

Example 4 may include the enhancement mechanism of example 1, wherein the neural network classifier includes non-linear activation functions strategically placed within the recurrent layers to learn complex dependencies of the spectrogram.

Example 5 may include the enhancement mechanism of example 1, wherein the ultrasonic attack detector to score the neural network classifier, calculate an attack score, and compare the attack score to a pre-determined threshold, wherein when the attack score is lower than the predetermined threshold, the ultrasonic attack detector to reject the detected keyword as an ultrasonic attack to prevent an attacker from executing malicious commands on the speech enabled device and wherein when the attack score is equal to or higher than the predetermined threshold, the ultrasonic attack detector to output the detected keyword as real human speech to trigger the speech enabled device.

Example 6 may include a method to enhance speech enabled devices comprising receiving, by an ultrasonic attack detector of a speech enabled device, an audio stream from one or more microphones and a segmentation signal from a keyword detector indicating a location of a detected keyword within the audio stream; preprocessing, by the ultrasonic attack detector, a segmented portion of the audio stream including the detected keyword to obtain a spectrogram; and executing, by the ultrasonic attack detector, a neural network classifier using the spectrogram as input, the neural network classifier to discern real human speech from intermodulation distortion products resulting from ultrasonic attacks on the speech enabled device.

Example 7 may include the method of example 6, wherein the keyword detector identifies keywords to activate or trigger the speech enabled device to respond using machine learning and automatic speech recognition techniques and outputs the segmentation signal to the ultrasonic attack detector.

Example 8 may include the method of example 6, wherein the neural network classifier includes two output classes, a first output class to fire off a dolphin attack signal and a second output class to fire off a real human speech signal.

Example 9 may include the method of example 6, wherein the neural network classifier is trained to recognize intermodulation distortion resulting from an ultrasonic attack and real human speech.

Example 10 may include the method of example 6, wherein preprocessing includes one or more of eliminating a non-zero direct current (DC) bias level from the segmented portion of the audio stream, boosting a signal level of the segmented portion of the audio stream, beamforming the segmented portion of the audio stream, and performing acoustic echo cancellation on the segmented portion of the audio stream.

Example 11 may include the method of example 6, wherein the neural network classifier comprises a recurrent topology having recurrent layers to extract features, learn patterns, learn temporal dependencies across frames, and capture high level dependencies and high levels of abstractions from the spectrogram.

Example 12 may include the method of example 11, wherein the neural network classifier includes non-linear activation functions strategically placed within the recurrent layers to learn complex dependencies from the spectrogram.

Example 13 may include the method of example 6, further comprising scoring the neural network classifier; calculating an attack score; and comparing the attack score to a pre-determined threshold, wherein when the attack score is lower than the pre-determined threshold, the method further comprising recognizing the detected keyword as an ultrasonic attack; and rejecting the detected keyword to prevent an attacker from executing malicious commands on the speech enabled device.

Example 14 may include the method of example 13, wherein if the attack score is equal to or better the pre-determined threshold, the method further comprising recognizing the detected keyword as real human speech; and outputting the detected keyword as the detected keyword trigger to trigger a response from the speech enabled device.

Example 15 may include the method of example 6, wherein a dolphin attack simulation is used to generate data to train the neural network classifier, wherein the dolphin attack simulation models an input speech baseband signal $x(t)$, wherein the input speech baseband signal $x(t)$ is modeled as an ultrasonic attack signal $y(t)$ by upsampling the input speech baseband signal $x(t)$ and modulating the signal into an ultrasonic band and corresponding carrier frequency for sending over the air to a device under attack, wherein at the device under attack, the signal $y(t)$ is modeled to incorporate intermodulation distortion by filtering $y(t)$ and down sampling to obtain $x'(t)$, wherein $x'(t)$ represents a model of the device under attack after an attack has occurred.

Example 16 may include at least one computer readable medium, comprising a set of instructions, which when executed by one or more computing devices, cause the one or more computing devices to receive, by an ultrasonic attack detector of a speech enabled device, an audio stream from one or more microphones and a segmentation signal from a keyword detector indicating a location of a detected keyword within the audio stream; preprocess, by the ultrasonic attack detector, a segmented portion of the audio stream including the detected keyword to obtain a spectrogram; and execute, by the ultrasonic attack detector, a neural network classifier using the spectrogram as input, the neural network classifier to discern real human speech from intermodulation distortion products resulting from ultrasonic attacks on the speech enabled device.

Example 17 may include the at least one computer readable medium of example 16, wherein the keyword detector identifies keywords to activate or trigger the speech enabled device to respond using machine learning and automatic speech recognition techniques and outputs the segmentation signal to the ultrasonic attack detector.

Example 18 may include the at least one computer readable medium of example 16, wherein the neural network classifier includes two output classes, a first output class to fire off a dolphin attack signal and a second output class to fire off a real human speech signal.

Example 19 may include the at least one computer readable medium of example 16, wherein the neural network classifier is trained to recognize intermodulation distortion resulting from an ultrasonic attack and real human speech.

Example 20 may include the at least one computer readable medium of example 16, wherein instructions to preprocess includes one or more instructions to eliminate a non-zero direct current (DC) bias level from the segmented portion of the audio stream, boost a signal level of the segmented portion of the audio stream, beamform the segmented portion of the audio stream, and perform acoustic echo cancellation on the segmented portion of the audio stream.

Example 21 may include the at least one computer readable medium of example 16, wherein the neural network classifier comprises a recurrent topology having recurrent layers to extract features, learn patterns, learn temporal dependencies across frames, and capture high level dependencies and high levels of abstractions from the spectrogram.

Example 22 may include the at least one computer readable medium of example 21, wherein the neural network classifier includes non-linear activation functions strategically placed within the recurrent layers to learn complex dependencies from the spectrogram.

Example 23 may include the at least one computer readable medium of example 16, further comprising a set of instructions, which when executed by one or more computing devices, cause the one or more computing devices to score the neural network classifier; calculate an attack score; and compare the attack score to a pre-determined threshold, wherein when the attack score is lower than the pre-determined threshold, the instructions, which when executed by the one or more computing devices, further cause the one or more computing devices to recognize the detected keyword as an ultrasonic attack; and reject the detected keyword to prevent an attacker from executing malicious commands on the speech enabled device.

Example 24 may include the at least one computer readable medium of example 23, wherein if the attack score is equal to or better the pre-determined threshold, the instructions, which when executed by the one or more computing devices, further cause the one or more computing devices to recognize the detected keyword as real human speech when the attack score is equal to or better the pre-determined threshold; and output the detected keyword as the detected keyword trigger to trigger a response from the speech enabled device.

Example 25 may include the at least one computer readable medium of example 16, wherein a dolphin attack simulation is used to generate data to train the neural network classifier, wherein the dolphin attack simulation models an input speech baseband signal $x(t)$, wherein the input speech baseband signal $x(t)$ is modeled as an ultrasonic attack signal $y(t)$ by upsampling the input speech baseband signal $x(t)$ and modulating the signal into an ultrasonic band and corresponding carrier frequency for sending over the air to a device under attack, wherein at the device under attack, the signal $y(t)$ is modeled to incorporate intermodulation distortion by filtering $y(t)$ and down sampling to obtain $x'(t)$, wherein $x'(t)$ represents a model of the device under attack after an attack has occurred.

Example 26 may include an apparatus comprising one or more substrates; and logic coupled to the one or more substrates, wherein the logic includes one or more of configurable logic or fixed-functionality hardware logic, the logic coupled to the one or more substrates to receive, by an ultrasonic attack detector of a speech enabled device, an audio stream from one or more microphones and a segmentation signal from a keyword detector indicating a location of a detected keyword within the audio stream; preprocess, by the ultrasonic attack detector, a segmented portion of the audio stream including the detected keyword to obtain a spectrogram; and execute, by the ultrasonic attack detector, a neural network classifier using the spectrogram as input, the neural network classifier to discern real human speech from intermodulation distortion products resulting from ultrasonic attacks on the speech enabled device.

Example 27 may include the apparatus of example 26, wherein the keyword detector identifies keywords to activate or trigger the speech enabled device to respond using machine learning and automatic speech recognition techniques and outputs the segmentation signal to the ultrasonic attack detector.

Example 28 may include the apparatus of example 26, wherein the neural network classifier includes two output classes, a first output class to fire off a dolphin attack signal and a second output class to fire off a real human speech signal.

Example 29 may include the apparatus of example 26, wherein the neural network classifier is trained to recognize intermodulation distortion resulting from an ultrasonic attack and real human speech.

Example 30 may include the apparatus of example 16, wherein the logic coupled to the one or more substrates to preprocess includes logic to eliminate a non-zero direct current (DC) bias level from the segmented portion of the audio stream, boost a signal level of the segmented portion of the audio stream, beamform the segmented portion of the audio stream, and perform acoustic echo cancellation on the segmented portion of the audio stream.

Example 31 may include the apparatus of example 26, wherein the neural network classifier comprises a recurrent topology having recurrent layers to extract features, learn patterns, learn temporal dependencies across frames, and capture high level dependencies and high levels of abstractions from the spectrogram.

Example 32 may include the apparatus of example 31, wherein the neural network classifier includes non-linear activation functions strategically placed within the recurrent layers to learn complex dependencies from the spectrogram.

Example 33 may include the apparatus of example 26, further comprising logic coupled to the one or more substrates to score the neural network classifier; calculate an attack score; and compare the attack score to a pre-determined threshold, wherein when the attack score is lower than the pre-determined threshold, the logic coupled to the one or more substrates to recognize the detected keyword as an ultrasonic attack; and reject the detected keyword to prevent an attacker from executing malicious commands on the speech enabled device.

Example 34 may include the apparatus of example 33, wherein if the attack score is equal to or better the pre-determined threshold, the apparatus further comprising logic coupled to the one or more substrates to recognize the detected keyword as real human speech when the attack score is equal to or better the pre-determined threshold; and output the detected keyword as the detected keyword trigger to trigger a response from the speech enabled device.

Example 35 may include the apparatus of example 26, wherein a dolphin attack simulation is used to generate data to train the neural network classifier, wherein the dolphin attack simulation models an input speech baseband signal $x(t)$, wherein the input speech baseband signal $x(t)$ is modeled as an ultrasonic attack signal $y(t)$ by upsampling the input speech baseband signal $x(t)$ and modulating the signal into an ultrasonic band and corresponding carrier frequency for sending over the air to a device under attack, wherein at the device under attack, the signal $y(t)$ is modeled to incorporate intermodulation distortion by filtering $y(t)$ and down sampling to obtain $x'(t)$, wherein $x'(t)$ represents a model of the device under attack after an attack has occurred.

Example 36 may include an apparatus enabling secure operations for speech enabled devices comprising means for receiving, by an ultrasonic attack detector of a speech enabled device, an audio stream from one or more microphones and a segmentation signal from a keyword detector indicating a location of a detected keyword within the audio stream; means for preprocessing, by the ultrasonic attack detector, a segmented portion of the audio stream including the detected keyword to obtain a spectrogram; and means for executing, by the ultrasonic attack detector, a neural network classifier using the spectrogram as input, the neural network classifier to discern real human speech from intermodulation distortion products resulting from ultrasonic attacks on the speech enabled device.

Example 37 may include the apparatus of example 36, wherein the keyword detector identifies keywords to activate or trigger the speech enabled device to respond using machine learning and automatic speech recognition techniques and outputs the segmentation signal to the ultrasonic attack detector.

Example 38 may include the apparatus of example 36, wherein the neural network classifier includes two output classes, a first output class to fire off a dolphin attack signal and a second output class to fire off a real human speech signal.

Example 39 may include the apparatus of example 36, wherein the neural network classifier is trained to recognize intermodulation distortion resulting from an ultrasonic attack and real human speech.

Example 40 may include the apparatus of example 36, wherein means for preprocessing includes one or more of means for eliminating a non-zero direct current (DC) bias level from the segmented portion of the audio stream, means for boosting a signal level of the segmented portion of the audio stream, means for beamforming the segmented portion of the audio stream, and means for performing acoustic echo cancellation on the segmented portion of the audio stream.

Example 41 may include the apparatus of example 36, wherein the neural network classifier comprises a recurrent topology having recurrent layers to extract features, learn patterns, learn temporal dependencies across frames, and capture high level dependencies and high levels of abstractions from the spectrogram.

Example 42 may include the apparatus of example 41, wherein the neural network classifier includes non-linear activation functions strategically placed within the recurrent layers to learn complex dependencies from the spectrogram.

Example 43 may include the apparatus of example 36, further comprising means for scoring the neural network classifier; means for calculating an attack score; and means for comparing the attack score to a pre-determined threshold, wherein when the attack score is lower than the pre-determined threshold, the apparatus further comprising means for recognizing the detected keyword as an ultrasonic attack; and means for rejecting the detected keyword to prevent an attacker from executing malicious commands on the speech enabled device.

Example 44 may include the apparatus of example 43, wherein if the attack score is equal to or better the pre-determined threshold, the apparatus further comprising means for recognizing the detected keyword as real human speech; and means for outputting the detected keyword as the detected keyword trigger to trigger a response from the speech enabled device.

Example 45 may include the apparatus of example 36, wherein a dolphin attack simulation is used to generate data to train the neural network classifier, wherein the dolphin attack simulation models an input speech baseband signal x(t), wherein the input speech baseband signal x(t) is modeled as an ultrasonic attack signal y(t) by upsampling the input speech baseband signal x(t) and modulating the signal into an ultrasonic band and corresponding carrier frequency for sending over the air to a device under attack, wherein at the device under attack, the signal y(t) is modeled to incorporate intermodulation distortion by filtering y(t) and down sampling to obtain x'(t), wherein x'(t) represents a model of the device under attack after an attack has occurred.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. An enhancement mechanism for speech enabled devices comprising:

one or more microphones to receive an audio stream;

a keyword detector coupled to the one or more microphones to detect utterances of keywords used to trigger a speech enabled device, wherein the keyword detector to provide a segmentation signal indicating the location of a detected keyword within the audio stream; and an ultrasonic attack detector coupled to the one or more microphones and the keyword detector to preprocess a segmented portion of the audio stream that includes the detected keyword to obtain a spectrogram and to run a neural network classifier using the spectrogram as input, the neural network classifier to discern real human speech from intermodulation distortion products resulting from ultrasonic attacks that enable an attacker to execute malicious commands on the speech enabled device without an awareness of a user.

2. The enhancement mechanism of claim 1, wherein the neural network classifier comprises a recurrent topology having recurrent layers to extract features of the spectrogram, learn patterns and temporal dependencies across frames associated with the spectrogram, and capture high level dependencies and high levels of abstractions from the spectrogram.

3. The enhancement mechanism of claim 1, wherein a neural network classifier output layer comprises two units, a first unit to fire for a dolphin attack signal and a second unit to fire for a real human baseband signal.

4. The enhancement mechanism of claim 1, wherein the neural network classifier includes non-linear activation functions strategically placed within the recurrent layers to learn complex dependencies of the spectrogram.

5. The enhancement mechanism of claim 1, wherein the ultrasonic attack detector to score the neural network classifier, calculate an attack score, and compare the attack score to a pre-determined threshold, wherein when the attack score is lower than the predetermined threshold, the ultrasonic attack detector to reject the detected keyword as an ultrasonic attack to prevent the attacker from executing the malicious commands on the speech enabled device and wherein when the attack score is equal to or higher than the predetermined threshold, the ultrasonic attack detector to output the detected keyword as real human speech to trigger the speech enabled device.

6. A method to enhance speech enabled devices comprising:

receiving, by an ultrasonic attack detector of a speech enabled device, an audio stream from one or more microphones and a segmentation signal from a keyword detector indicating a location of a detected keyword within the audio stream;

preprocessing, by the ultrasonic attack detector, a segmented portion of the audio stream including the detected keyword to obtain a spectrogram; and executing, by the ultrasonic attack detector, a neural network classifier using the spectrogram as input, the neural network classifier to discern real human speech from intermodulation distortion products resulting from ultrasonic attacks that allow an attacker to execute malicious commands on the speech enabled device without an awareness of a user.

7. The method of claim 6, wherein the keyword detector identifies keywords to activate or trigger the speech enabled device to respond using machine learning and automatic speech recognition techniques and outputs the segmentation signal to the ultrasonic attack detector.

8. The method of claim 6, wherein the neural network classifier includes two output classes, a first output class to fire off a dolphin attack signal and a second output class to fire off a real human speech signal.

9. The method of claim 6, wherein the neural network classifier is trained to recognize intermodulation distortion resulting from an ultrasonic attack and real human speech.

10. The method of claim 6, wherein preprocessing includes one or more of eliminating a non-zero direct current (DC) bias level from the segmented portion of the audio stream, boosting a signal level of the segmented portion of the audio stream, beamforming the segmented portion of the audio stream, and performing acoustic echo cancellation on the segmented portion of the audio stream.

11. The method of claim 6, wherein the neural network classifier comprises a recurrent topology having recurrent layers to extract features, learn patterns, learn temporal dependencies across frames, and capture high level dependencies and high levels of abstractions from the spectrogram.

12. The method of claim 11, wherein the neural network classifier includes non-linear activation functions strategically placed within the recurrent layers to learn complex dependencies from the spectrogram.

13. The method of claim 6, further comprising:

scoring the neural network classifier;

calculating an attack score; and comparing the attack score to a pre-determined threshold, wherein when the attack score is lower than the predetermined threshold, the method further comprising:

recognizing the detected keyword as an ultrasonic attack; and rejecting the detected keyword to prevent the attacker from executing the malicious commands on the speech enabled device.

14. The method of claim 13, wherein if the attack score is equal to or better the pre-determined threshold, the method further comprising:

recognizing the detected keyword as real human speech; and outputting the detected keyword as the detected keyword trigger to trigger a response from the speech enabled device.

15. The method of claim 6, wherein a dolphin attack simulation is used to generate data to train the neural network classifier, wherein the dolphin attack simulation models an input speech baseband signal $x(t)$, wherein the input speech baseband signal $x(t)$ is modeled as an ultrasonic attack signal $y(t)$ by upsampling the input speech baseband signal $x(t)$ and modulating the signal into an ultrasonic band and corresponding carrier frequency for sending over the air to a device under attack, wherein at the device under attack, the signal $y(t)$ is modeled to incorporate intermodulation distortion by filtering $y(t)$ and down sampling to obtain $x'(t)$, wherein $x'(t)$ represents a model of the device under attack after an attack has occurred.

16. At least one non-transitory computer readable medium, comprising a set of instructions, which when executed by one or more computing devices, cause the one or more computing devices to:

receive, by an ultrasonic attack detector of a speech enabled device, an audio stream from one or more microphones and a segmentation signal from a keyword detector indicating a location of a detected keyword within the audio stream;

preprocess, by the ultrasonic attack detector, a segmented portion of the audio stream including the detected keyword to obtain a spectrogram; and execute, by the ultrasonic attack detector, a neural network classifier using the spectrogram as input, the neural network classifier to discern real human speech from intermodulation distortion products resulting from ultrasonic attacks that allow an attacker to execute malicious commands on the speech enabled device without an awareness of a user.

17. The at least one non-transitory computer readable medium of claim 16, wherein the keyword detector identifies keywords to activate or trigger the speech enabled device to respond using machine learning and automatic speech recognition techniques and outputs the segmentation signal to the ultrasonic attack detector.

18. The at least one non-transitory computer readable medium of claim 16, wherein the neural network classifier includes two output classes, a first output class to fire off a dolphin attack signal and a second output class to fire off a real human speech signal.

19. The at least one non-transitory computer readable medium of claim 16, wherein the neural network classifier is trained to recognize intermodulation distortion resulting from an ultrasonic attack and real human speech.

20. The at least one non-transitory computer readable medium of claim 16, wherein instructions to preprocess includes one or more instructions to eliminate a non-zero direct current (DC) bias level from the segmented portion of the audio stream, boost a signal level of the segmented portion of the audio stream, beamform the segmented portion of the audio stream, and perform acoustic echo cancellation on the segmented portion of the audio stream.

21. The at least one non-transitory computer readable medium of claim 16, wherein the neural network classifier comprises a recurrent topology having recurrent layers to extract features, learn patterns, learn temporal dependencies across frames, and capture high level dependencies and high levels of abstractions from the spectrogram.

22. The at least one non-transitory computer readable medium of claim 21, wherein the neural network classifier includes non-linear activation functions strategically placed within the recurrent layers to learn complex dependencies from the spectrogram.

23. The at least one non-transitory computer readable medium of claim 16, further comprising a set of instructions, which when executed by one or more computing devices, cause the one or more computing devices to:

score the neural network classifier;

calculate an attack score; and compare the attack score to a pre-determined threshold, wherein when the attack score is lower than the pre-determined threshold, the one or more computing devices to:

recognize the detected keyword as an ultrasonic attack; and reject the detected keyword to prevent the attacker from executing the malicious commands on the speech enabled device.

24. The at least one non-transitory computer readable medium of claim 23, wherein if the attack score is equal to or better the pre-determined threshold, the instructions, which when executed by the one or more computing devices, further cause the one or more computing devices to:

recognize the detected keyword as real human speech when the attack score is equal to or better the pre-determined threshold; and output the detected keyword as the detected keyword trigger to trigger a response from the speech enabled device.

25. The at least one non-transitory computer readable medium of claim 16, wherein a dolphin attack simulation is used to generate data to train the neural network classifier, wherein the dolphin attack simulation models an input speech baseband signal x(t), wherein the input speech baseband signal x(t) is modeled as an ultrasonic attack signal y(t) by upsampling the input speech baseband signal x(t) and modulating the signal into an ultrasonic band and corresponding carrier frequency for sending over the air to a device under attack, wherein at the device under attack, the signal y(t) is modeled to incorporate intermodulation distortion by filtering y(t) and down sampling to obtain x'(t), wherein x'(t) represents a model of the device under attack after an attack has occurred.

* * * * *